United States Patent [19]

Bachmann

[11] Patent Number: 4,557,462
[45] Date of Patent: Dec. 10, 1985

[54] ROTARY VALVE ASSEMBLY FOR USE IN REGULATING THE FLOW OF MOLTEN MATERIAL

[75] Inventor: Herbert Bachmann, Adligenswil, Switzerland

[73] Assignee: Stopinc Aktiengesellschaft, Baar, Switzerland

[21] Appl. No.: 566,382

[22] Filed: Dec. 28, 1983

[30] Foreign Application Priority Data

Jan. 11, 1983 [CH] Switzerland .................... 123/83

[51] Int. Cl.⁴ ............................................. F16K 25/00
[52] U.S. Cl. ..................................... 251/184; 251/86; 464/102
[58] Field of Search ............... 251/183, 184, 360, 292, 251/133, 86, 361, 362, 363, 364, 365, 357, 359, 367; 403/28, 30; 464/102, 154, 157, 158, 159

[56] References Cited

U.S. PATENT DOCUMENTS

| | | | |
|---|---|---|---|
| 871,956 | 11/1907 | Rice | 251/184 |
| 1,002,835 | 9/1911 | Gorton | 251/86 |
| 1,043,935 | 11/1912 | Hitchcock | 251/86 |
| 1,741,983 | 12/1929 | Ellberg et al. | 251/86 |
| 1,769,107 | 7/1930 | Brown | 464/102 |
| 1,791,914 | 2/1931 | Tomlinson | 251/184 |
| 2,813,409 | 11/1957 | Wolcott | 464/102 |
| 3,662,986 | 5/1972 | Domulewicz, Sr. | 251/144 |
| 4,347,715 | 9/1982 | Carman et al. | 464/154 |
| 4,475,712 | 10/1984 | DeJager | 251/86 |

FOREIGN PATENT DOCUMENTS

| | | | |
|---|---|---|---|
| 893801 | 3/1982 | Belgium . | |
| 470936 | 1/1951 | Canada | 251/184 |
| 2043588 | 3/1972 | Fed. Rep. of Germany . | |
| 428975 | 1/1948 | Italy | 251/184 |
| 183421 | 7/1922 | United Kingdom . | |
| 349370 | 5/1931 | United Kingdom | 251/184 |
| 412113 | 6/1934 | United Kingdom | 251/184 |

Primary Examiner—James C. Yeung
Attorney, Agent, or Firm—Wenderoth, Lind & Ponack

[57] ABSTRACT

A rotary valve assembly for use in regulating the flow of molten material includes a stator member having therethrough a flow opening and adapted to be fixed to a source of molten material with the flow opening communicating with such source. The stator member has therein a rotor-receiving opening interrupting the flow opening and defined by a conical bearing surface. A frusto-conical shaped rotor member extends into the rotor-receiving opening, and the rotor member has an outer surface complementary to the bearing surface of the stator member. The rotor member has extending laterally therethrough a flow opening which, upon rotation of the rotor member with respect to the stator member, may be moved into and out of alignment with the flow opening of the stator member. A power driven device is provided to rotate the rotor member with respect to the stator member, thereby to selectively regulate the relative degree of alignment of the flow openings. A mechanical clutch transmits rotational torque of the power driven device to the rotor member and urges the rotor member toward the stator member to ensure sealing engagement between the outer surface of the rotor member and the sealing surface of the stator member, while at the same time enabling relative axial, lateral and angular displacements between the rotor and stator members due to thermal expansion and/or contraction.

21 Claims, 5 Drawing Figures

4,557,462

ROTARY VALVE ASSEMBLY FOR USE IN REGULATING THE FLOW OF MOLTEN MATERIAL

BACKGROUND OF THE INVENTION

The present invention relates to a turning lock or rotary valve assembly for use in regulating the flow of molten material, more particularly baths of molten material such as molten metal, wherein a rotor member in the form of a locking or sealing body is rotatably mounted in a stator member and has a flow opening that can be sealed by rotating the rotor member and which extends transversely through the rotor member.

During the use of such an assembly, and specifically upon a plurality of opening and closing movements in the presence of a molten material such as molten metal which is heated to an elevated temperature, the valve or sealing assembly must ensure sealing or tightness along the mutual contacting surfaces of the members in order to allow extended operation of the assembly without maintenance or exchange of the members thereof. This operational problem is aggravated by the fact that the members must not, under any circumstances, become jammed during operation, for example due to thermal expansion or relative displacements of the members, in a manner such that the assembly no longer can be opened or closed, even upon the application of a large amount of energy. Another problem relating to the operation of such assemblies is that at high operating temperatures the stator and rotor members, which are formed of heat resistant non-metallic material, are subjected to uncontrolled deformations and cannot be fixedly secured in a housing by means of known mechanical constructions.

British Patent No. 183,421 discloses an assembly which employs sand and coal above the rotor member. However, this is not practical when regulating the flow of certain molten materials, particularly molten metals, and more particularly light metals. Furthermore, there is the danger that the molten metal can enter the gap between the members that turn relative to one another, which gap will vary in size during operation due to relative heat expansion. This molten metal will solidify and subsequently block the movement of the rotor member.

West German Patent No. 2,043,588 discloses an assembly mounted on a container for liquid melts, in which a frusto-conical member is provided with an eccentric flow conduit extending in the longitudinal direction of the member. Such a construction can be used only for a freely discharging bottom spout, but cannot be used in situations such as where a pipeline or the like is rigidly connected to the discharge of a vessel or container or to the housing of the assembly.

SUMMARY OF THE INVENTION

With the above discussion in mind, it is the object of the present invention to provide a rotary valve or sealing assembly for use in regulating the flow of molten material whereby there is achieved a perfect seal even during relative thermal expansions of the members of the assembly over use thereof for extended operating periods, which can be opened and closed with a high degree of certainty, and in which downgate and lip bear a fixed relationship to one another.

This object is achieved in accordance with the present invention by the provision of a rotary valve assembly for use in regulating the flow of molten material, the assembly including a stator member having therethrough a flow opening and adapted to be fixed to a source of molten material with the flow opening communicating with the source, the stator member having therein a rotor-receiving opening interrupting the flow opening therein and defined by a conical bearing surface. A frusto-conical shaped rotor member extends into the rotor-receiving opening in the stator member, the rotor member having an outer surface complementary to the bearing surface of the stator member. The rotor member has extending laterally therethrough a flow opening which, upon rotation of the rotor member with respect to the stator member, may be moved into and out of alignment with the flow opening of the stator member, thereby regulating the flow of molten material through the assembly. A power driven device is adapted to be rotated to rotate the rotor member with respect to the stator member, and thereby to selectively regulate the relative degree of alignment of the flow openings in the stator and rotor members. A mechanical clutch transmits the rotational torque of the power driven device to the rotor member and urges the rotor member toward the stator member to ensure sealing engagement between the outer surface of the rotor member and the sealing surface of the stator member, while enabling relative axial, lateral and angular displacements between the rotor and stator members which might occur due to thermal expansion and/or contraction thereof. The mechanical clutch includes spring means, supported by the power driven device, for urging the rotor member axially toward the stator member. The clutch further includes an intermediate plate positioned to confront the larger diameter end of the rotor member, first connecting means for connecting the intermediate plate to the power driven device such that rotation of the power driven device is transmitted to the intermediate plate, and second connecting means for connecting the intermediate plate to the rotor member such that rotation of the intermediate plate is transmitted to the rotor member. The spring means acts on the intermediate plate to urge the intermediate plate toward the rotor member, thereby urging the rotor member axially toward the stator member.

In accordance with one arrangement of the present invention, the power driven device comprises a drive shaft mounted for rotation about the longitudinal axis thereof, and the first connecting means comprises curved peripheral teeth on the drive shaft and in meshing engagement with teeth of the intermediate plate. The spring means comprises a spring bolt supported by the end of the drive shaft and acting on the intermediate plate centrally thereof. The second connecting means comprises a key-groove connection between the intermediate plate and the rotor member.

In accordance with another arrangement of the present invention, the power driven device comprises a disc-shaped element mounted for rotation about an axis thereof, and the first connecting means comprises a clutch plate positioned between the intermediate plate and the disc-shaped element. Driver elements are connected between the clutch plate and the disc-shaped element and between the clutch plate and the intermediate plate. The driver elements comprise pins fixed to and extending from opposite sides of the clutch plate into respective recesses in the disc-shaped element and the intermediate plate. Such pins have heads with at least partial spherical surfaces, thereby enabling relative angular displacements between the axes of the rotor member and of the disc-shaped element. The recesses preferably comprise diametrically elongated slots or openings, thereby enabling relative parallel displacements between the axes of the rotor member and of the disc-shaped element. Preferably there is provided a pair of diametrically spaced pins extending from each side of the clutch plate, and each such pair of pins extends in a plane which extends transversely to the plane of the other pair of pins. Respective axial gaps are provided between the clutch plate and the disc-shaped element and between the clutch plate and the intermediate plate, thereby enabling axial and/or angular displacements. The disc-shaped element has peripheral teeth adapted to be rotated due to a motor driven rotary drive in engagement with such teeth. The second connecting means comprises a plurality of circumferentially spaced discs each of which fits in recesses in the larger diameter end of the rotor member and in the confronting surface of the intermediate plate. The spring means comprise a plurality of spring bolts supported by the disc-shaped element at positions spaced circumferentially about the axis thereof and acting on the intermediate plate at positions spaced circumferentially about the axis thereof. Preferably, the spring bolts act on an annular flange of the intermediate plate, which flange surrounds the clutch plate with an annular clearance therebetween. The disc-shaped element has extending axially therefrom a cylindrical bearing carrying a bushing for achieving rotatable support of the disc-shaped element, such as on a housing of the assembly.

The assembly includes a housing supporting the stator member and rotatably supporting the power driven device. The housing includes adjustable holding fixtures for supporting the stator member in the housing. Such fixtures comprise plates mounted to confront the smaller diameter end of the rotor member and plates mounted at lateral sides and at the bottom of the stator member. Preferably, heat insulating inserts are positioned between the stator member and the respective plates.

In accordance with a further feature of the present invention, one or both of the conical bearing surface of the stator member and the outer surface of the rotor member may be formed by a suitably conical shaped sleeve secured against rotation relative to the respective member.

Due to the fact that in accordance with the present invention the rotor member is not rigidly fixed in either its relative axial position with respect to the stator member and with respect to its longitudinal axis of rotation, expansion and/or contraction due to heat which inevitably causes a relative change of position of one or both of the members will not result in jamming of the members. Since the stator member has a flow opening which extends in a direction perpendicular to the axis of rotation of the rotor member, the stator member can be fixedly mounted between two system components, for example between a furnace wall and a pipeline, and it also is possible to arrange such flow opening in a substantially horizontal position, for example as a connection between two stationary containers.

BRIEF DESCRIPTION OF THE DRAWINGS

Other objects, features and advantages of the present invention will be apparent from the following detailed description, taken with the accompanying drawings, wherein.

DETAILED DESCRIPTION OF THE INVENTION

Figure 1:
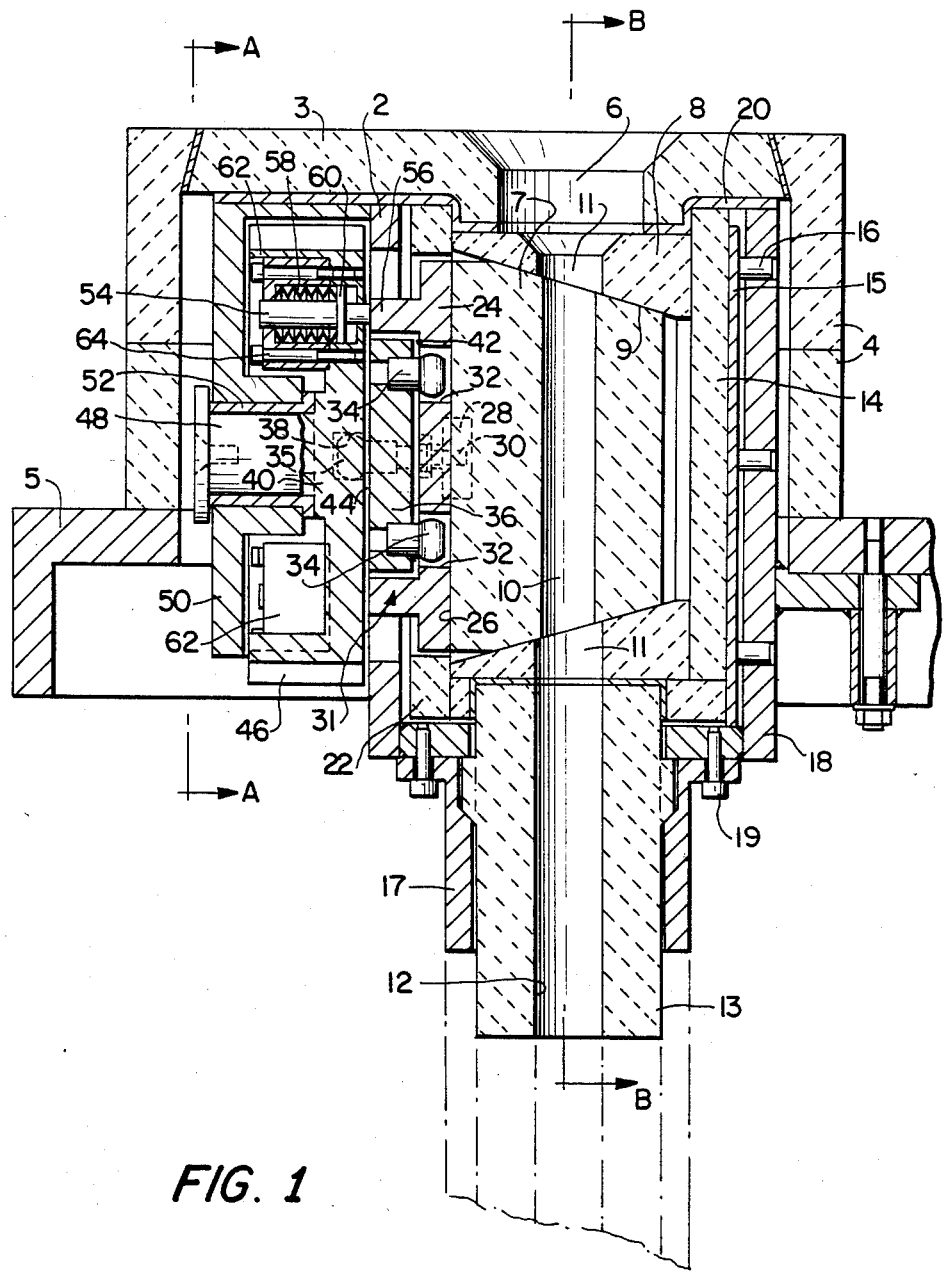
FIG. 1 is a longitudinal sectional view through an assembly in accordance with one embodiment of the present invention.
Figure 2:
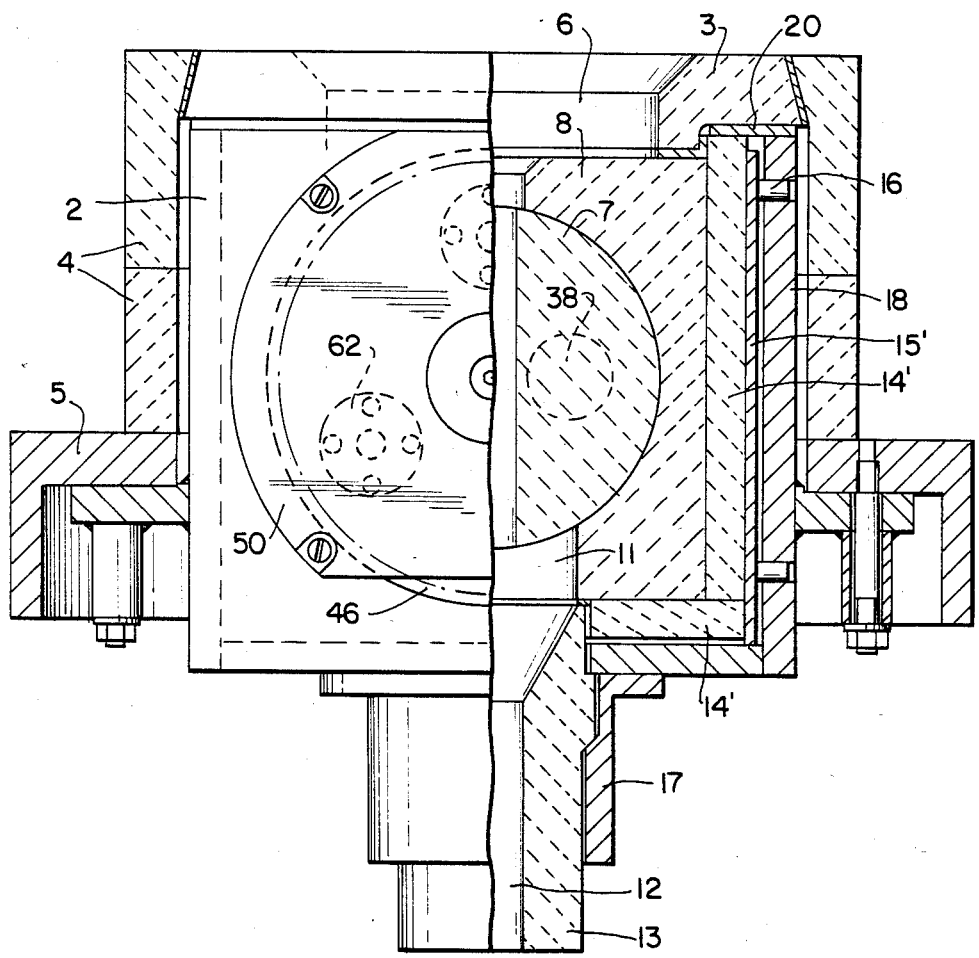
FIG. 2 is a divided cross-sectional view, the left side of FIG. 2 being a view taken along line A—A of FIG. 1, and the right side of FIGS. 2 being a view taken along the line B—B of FIG. 1.

The turning lock or rotary valve assembly shown in FIGS. 1 and 2 is designed for cooperation with a container or vessel holding a molten material, more particularly a molten light metal material. The assembly includes a generally cylindrical or box-shaped housing 2 and extends into a cavity formed by special refractory bricks 4 and by a perforated refractory plate 3 in the refractory lining of the vessel (not shown). A flange 5 is an integral part of the metal wall of the vessel and serves as means for attachment of the assembly of the present invention. Refractory plate 3 is provided with an opening 6 through which a molten material is discharged from the vessel interior positioned thereabove.

Within the interior of housing 2 there is positioned a locking cone or rotor member 7 in the form of a frustoconical member having a conical angle of, for example, approximately 30°. Rotor member 7 extends into a rotor-receiving opening within a stator member 8. The rotor-receiving opening is complementary in configuration to the outer surface of the rotor member 7 and is defined by a conical bearing surface 9. Rotor member 7 is formed of a suitable ceramic material as would be understood by one skilled in the art. Stator member 8 is formed of a suitable material, such as a heat resistant graphite material, as would be understood by one of ordinary skill in the art. Rotor member 7 has extending laterally therethrough a flow opening 10 extending at a right angle to the axis of rotor member 7. Stator member 8 also is provided with a flow opening 11 which is interrupted by the rotor-receiving opening. Rotation of rotor member 7 with respect to stator member 8 may selectively result in flow opening 10 being brought into and out of alignment with flow opening 11 in a regulated manner, thereby regulating the discharge of molten material from the vessel interior through opening 6 in plate 3 to a passage 12 in a delivery pipe 13. Pipe 13 is open at the bottom and is made of a suitable refractory material as will be understood by one of ordinary skill in the art. Pipe 13 is replaceably mounted by means of a sleeve 17 which is attached by means of bolts 19. Alternatively, as shown by the dashed lines in FIG. 1, a trough or pipeline can be flange mounted in place of pipe 13.

Confronting the smaller diameter end of rotor member 7 is a heat insulating insert 14 which is pressed against a corresponding side of stator member 8 by means of a holding plate 15. Thus, screws 16 attached to housing wall 18 are operable to cause plate 15 to press insert 14 against stator member 8. Similar heat insulating inserts 14' are positioned on side walls and the bottom of stator member 8 and are partly supported from housing 2 by means of respective holding plates 15', as shown particularly in FIG. 2. The upper side of stator member 8, or the entire assembly, is separated from bottom plate 3 by a heat resistant seal 20, for example a ceramic fiber mat, which also has a heat insulating effect. On the face of stator member 8 opposite the insert 14 there is provided a heat insulating ring 22 having therein an opening into which extends an intermediate plate 24. Radial play is provided between intermediate plate 24 and ring 22. Intermediate plate 24 abuts against the larger diameter end face of rotor member 7. To transmit rotary motion from intermediate plate 24 to rotor member 7, a plurality of cylindrical discs 28 are positioned to extend into appropriately shaped recesses in end face 26 of rotor member 7 and intermediate plate 24. In a preferred arrangement, there are provided three cylindrical discs 28 spaced respectively around the axis of rotor member 7 at 120°. Each disc 28 is attached to and held in a respective recess in intermediate plate 24 by means of a screw 30. Intermediate plate 24 furthermore is provided with two diametrically opposed recesses 32, preferably having the shape of slotted holes or diametrically extending slots. Two driver pins 34 having spherical shaped heads engage in slotted recesses 32. Driver pins 34 are securely attached to a clutch plate 36. Two additional driver pins 35 are attached to and project from the opposite side of clutch plate 36. Driver pins 35 extend in a plane which is transverse to the plane containing driver pins 34. Thus, each pin 35 is displaced by 90° relative to driver pins 34. Thus, each pair of pins 34, 35 extend in a respective plane, the two planes being mutually perpendicular and passing through the longitudinal axes of pins 34 and of pins 35. Each driver pin 35 engages in a respective recess 38 in a disc-shaped driving element 40. Recesses 38 preferably are formed as slotted holes or as diametrically extending slots.

Recesses 32, 38 run crosswise to one another, i.e. their longitudinal axes are mutually displaced by 90°. A gap 42 is provided between clutch plate 36 and intermediate plate 24, and also an annular gap is provided around the periphery of clutch plate 36 and an annular flange 56 of intermediate plate 24. A further gap 44 is provided between clutch plate 36 and element 40.

Element 40 is in the shape of a pinion or gear and has peripheral teeth 46 adapted to be engaged by a gear of a motor driven rotary drive, not shown. Element 40 has centrally thereof on the side facing away from rotor member 7 a cylindrical bearing shaft or pin 48 engaging in a bearing bushing 52 carried by an annular flange 50 supported by housing 2.

Supported in driving element 40 are a plurality of coronally arranged or circumferentially spaced spring bolts 54 which abut on annular flange 56 of intermediate plate 24. In the illustrated arrangement, there are provided three uniformly circumferentially spaced spring bolts 54. A spring 58, preferably in the form of an initially stressed cup spring package, abuts on an annular shoulder 60 of each spring bolt 54. A cylindrical spring housing 62 is connected to driving element 40 by means of screws 64 and supports each spring bolt. Spring devices 54, 58, 60 revolve with driving element 40, clutch plate 36, intermediate plate 24 and rotor member 7, and the force of the springs 58 cause rotor member 7 to be pressed axially into the rotor-receiving opening in stator member 8 and thereby to bear in a tight sealing manner against bearing surface 9.

The assembly of the present invention forms a modular unit which as a whole can be connected to or disconnected from a melt containing vessel, for example a furnace, or with troughs or pipelines. The mounting of the assembly of the present invention need not be vertical as shown in FIGS. 1 and 2, but can be horizontal, or can follow the tipping motions of a ladle or the like.

The operation of the assembly shown in FIGS. 1 and 2 is as follows. Thus, gears 46 mesh with a gear of an electric, hydraulic or pneumatic motor, and therefore element 40 is rotated about the axis of bearing shaft 48. This causes rotation of clutch member 36, intermediate plate 24 and rotor member 7. Therefore, flow opening 10 rotates relative to flow opening 11 of stator member 8, to relatively open or close the discharge of molten material. Springs 58 cause bolts 54 to apply a predetermined axial force causing rotor member 7 to be pressed against bearing surface 9. The arrangement described above allows rotation of the rotor member while pressing the rotor member against bearing surface 9 while enabling relative axial, lateral and angular displacements between the rotor and stator members due to thermal expansion and/or contraction. Thus, thermal expansion and small axial displacements, for example as a result of continuous operation, are absorbed by the flexibly mounted spring bolts 54.

In the event of the occurrence of angular differences between the axis of rotation of element 40 and the axis of rotation of rotor member 7, such angular differences are compensated for by the clutch located between such elements and indicated generally by reference numeral 31. Thus, since the heads of pins 34, 35 are spherical shaped, and since there are gaps provided on opposite sides of clutch plate 36, angular variations can be absorbed without the occurrence of jamming between the parts which move relative to one another.

In the event of the occurrence of parallel displacements between the axes of rotation of element 40 and rotor member 7, such displacements can be compensated for by the crosswise radial displacement of the heads of pins 34 in slotted holes 32 and of the heads of pins 35 in slotted holes 38.

In the above manner, even the occurrence of overlapping angular and parallel displacements cannot prevent the transmission of rotary motion between element 40 and rotor member 7, and an accurate fit of the rotor member in the stator member is assured even if the mounting of the stator member cannot be reproduced with precision or even if its position has changed.

Figure 3:
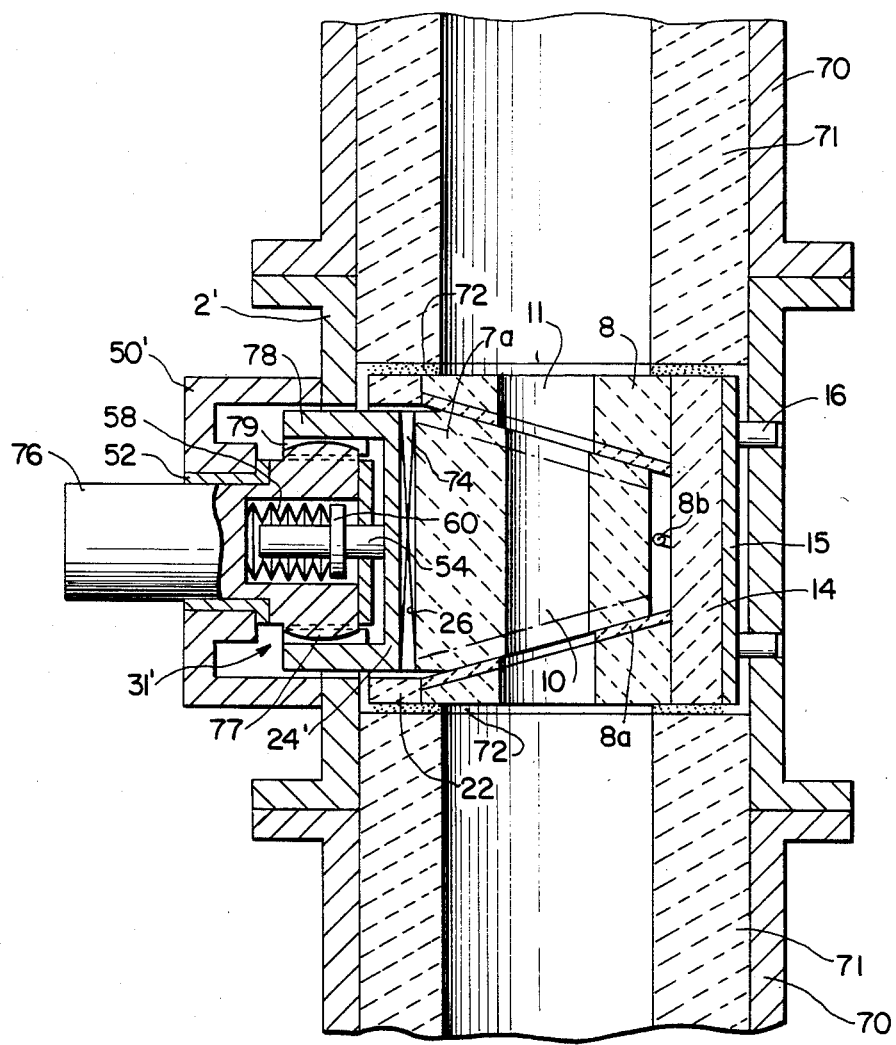
FIG. 3 is a view similar to FIG. 1, but of another embodiment of the assembly of the present invention.
Figure 4:
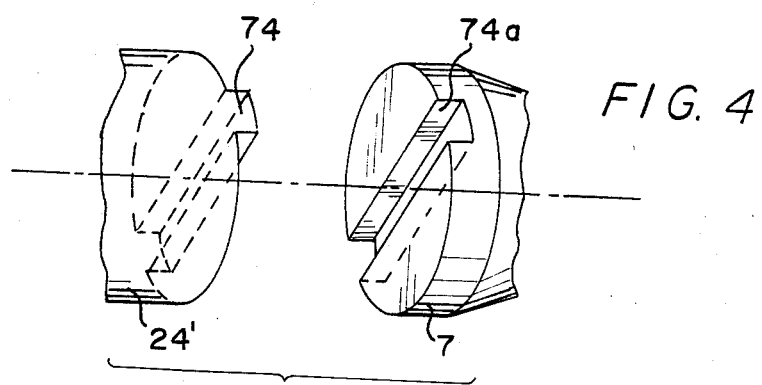
FIG. 4 is a partial, exploded perspective view of a feature of the embodiment of FIG. 3.
Figure 5:
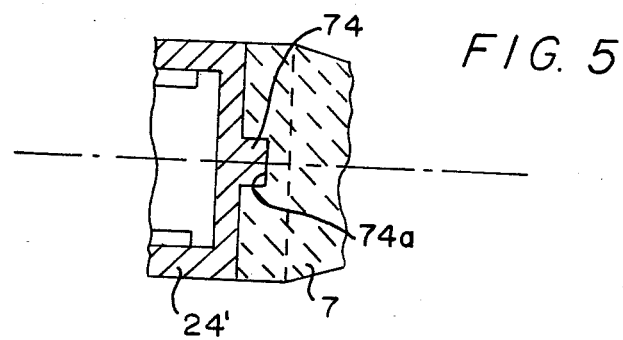
FIG. 5 is a partial sectional view of the elements of FIG. 4 shown assembled.

A modification of the assembly of the present invention is shown in FIG. 3, wherein like reference numerals indicate like elements as in the embodiment of FIGS. 1 and 2. Thus, housing 2' is designed to enable mounting of the assembly between sections 70 of a pipeline, for example a pipeline for molten aluminum, whereby end face connection of pipeline lining 71 on opposite ends of stator member 8 is effected via a morter layer or seal 72, for example formed of a bonded mat. Instead of the plurality of circumferentially arranged spring devices 54, 58, 62 provided in the embodiment of FIGS. 1 and 2, in the embodiment of FIG. 3 only a single centrally arranged spring bolt 54 is provided. This spring bolt 54 is pressed against an intermediate plate 24' by means of stronger springs 58, for example cup springs. In this arrangement the rotary drive from intermediate plate 24' to rotor member 7a is achieved by a key-groove connection including a key 74 and a groove 74a as shown in FIGS. 4 and 5. Centrally arranged spring device 54, 58, 60 is housed in the end of a drive shaft 76 which is rotatably mounted in a support 50' fixedly connected to housing 2'. Support 50' at the same time can support a motor (not shown) for driving shaft 76. A rotary clutch, generally designated as 31', between shaft 76 and intermediate plate 24' is in the form of a so-called curved tooth coupling. Thus, the head or end of shaft 76 is provided with curved teeth 77, and a sleeve 78 of intermediate plate 24' surrounds teeth 77 and is provided with internal teeth 79 meshing therewith with adequate radial play.

The arrangement of FIG. 3 also allows change of position of the members 7a, 8 within housing 2', as well as subsequent small changes of position without adversely effecting the tightness of the seal. Axial displacements of rotor member 7a and parallel displacements between the axes of member 7a and shaft 6, as well as angular displacements therebetween, can be absorbed by clutch 31'. Except as otherwise described, the design and manner of operation of this embodiment is similar to that of the embodiment of FIGS. 1 and 2 described above.

FIG. 3 also illustrates another feature of the present invention, i.e. the possibility of constructing stator member 8 as a so-called "combined" body in order to provide the bearing surface 9 with special properties, for example with respect to wear resistance, slip characteristics, scuff resistance, heat conductivity, etc. Thus, stator member 8 may be provided with a conical-shaped removable sleeve 8a which provides the bearing surface 9. Sleeve 8a may be loosely inserted as an integral part of stator member 8, but is secured against rotation with respect thereto, for example by means of pin 8b which is attached to member 8 and which engages in an axial slot in sleeve 8a. Therefore, sleeve 8a which provides the bearing surface can be replaced alone without the need for replacing the entire stator member 8. Similarly, rotor member 7 can be provided with a sleeve as illustrated by the dashed lines in FIG. 3. It will be understood that this feature of the present invention can be employed in the embodiment of FIGS. 1 and 2.

Although the present invention has been described and illustrated with respect to preferred features thereof, it is to be understood that various modifications and changes may be made to the specifically described and illustrated features without departing from the scope of the present invention. Furthermore, although the specific materials of the various elements of the present invention have not been discussed in detail, those of ordinary skill in the art what materials may be employed to form the various elements of the present invention.

I claim:

1. A rotary valve assembly for use in regulating the flow of molten material, said assembly comprising:
   a stator member having therethrough a flow opening and adapted to be fixed to a source of molten material with said flow opening communicating with such source, said stator member having therein a rotor-receiving opening interrupting said flow opening and defined by a conical bearing surface;
   a frusto-conical shaped rotor member extending into said rotor-receiving opening, said rotor member having an outer surface complementary to said bearing surface of said stator member, and said rotor member having extending laterally therethrough a flow opening which, upon rotation of said rotor member with respect to said stator member, may be moved into and out of alignment with said flow opening of said stator member;
   power driven means for rotating said rotor member with respect to said stator member, and thereby for selectively regulating the relative degree of alignment of said flow openings;
   a housing encasing and fixedly supporting said stator member and rotatably supporting said power driven means for rotation about a fixed axis thereof; and
   mechanical clutch means for transmitting rotational torque of said power driven means to said rotor member, and for urging said rotor member toward said stator member to ensure sealing engagement between said outer surface of said rotor member and said bearing surface of said stator member, while enabling relative axial, lateral and angular displacements between said rotor and stator members due to thermal expansion and/or contraction thereof.

2. An assembly as claimed in claim 1, wherein said clutch means includes spring means, supported by said power driven means, for urging said rotor member axially toward said stator member.

3. An assembly as claimed in claim 2, wherein said clutch means further includes an intermediate plate positioned to confront a larger diameter end of said rotor member, first connecting means for connecting said intermediate plate to said power driven means such that rotation of said power driven means is transmitted to said intermediate plate, and second connecting means for connecting said intermediate plate to said rotor member such that rotation of said intermediate plate is transmitted to said rotor member, and wherein said spring means acts on said intermediate plate to urge said intermediate plate toward said rotor member, thereby to urge said rotor member axially toward said stator member.

4. An assembly as claimed in claim 3, wherein said power driven means comprises a drive shaft mounted for rotation about the longitudinal axis thereof in said housing, and said first connecting means comprises curved peripheral teeth on said drive shaft engaging teeth of said intermediate plate.

5. An assembly as claimed in claim 4, wherein said spring means comprises a spring bolt supported by the end of said drive shaft and acting on said intermediate plate centrally thereof.

6. An assembly as claimed in claim 4, wherein said second connecting means comprises a key-groove connection between said intermediate plate and said rotor member.

7. An assembly as claimed in claim 3, wherein said power driven means comprises a disk-shaped element mounted for rotation about an axis thereof in said housing, and said first connecting means comprises a clutch plate positioned between said intermediate plate and said disk-shaped element, and driver elements connected between said clutch plate and said disk-shaped element and between said clutch plate and said intermediate plate.

8. An assembly as claimed in claim 7, wherein said driver elements comprise pins fixed to and extending from opposite sides of said clutch plate into respective recesses in said disk-shaped element and said intermediate plate.

9. An assembly as claimed in claim 8, wherein said pins have heads with partial spherical surfaces, thereby enabling relative angular displacements between the axes of said rotor member and of said disk-shaped element.

10. An assembly as claimed in claim 8, wherein said recesses comprise diametrically elongated slots, thereby enabling relative parallel displacements between the axes of said rotor member and of said disk-shaped element.

11. An assembly as claimed in claim 8, comprising a pair of diametrically spaced said pins extending from each said side of said clutch plate, said pairs extending in respective planes extending transverse to each other.

12. An assembly as claimed in claim 7, further comprising respective axial gaps between said clutch plate and said disk-shaped element and between said clutch plate and said intermediate plate.

13. An assembly as claimed in claim 7, wherein said disk-shaped element includes peripheral teeth adapted to be engaged by a motor driven rotary drive.

14. An assembly as claimed in claim 7, wherein said second connecting means comprises a plurality of circumferentially spaced disks fitted in recesses in said larger diameter end of said rotor member and in the confronting surface of said intermediate plate.

15. An assembly as claimed in claim 7, wherein said spring means comprise a plurality of spring bolts supported by said disk-shaped element at positions spaced circumferentially about the axis thereof and acting on said intermediate plate at positions spaced circumferentially about the axis thereof.

16. An assembly as claimed in claim 15, wherein said spring bolts act on an annular flange of said intermediate plate, said annular flange surrounding said clutch plate with an annular clearance therebetween.

17. An assembly as claimed in claim 7, wherein said disk-shaped element has extending axially therefrom a cylindrical bearing carrying a bushing for achieving rotatable support of said disk-shaped element.

18. An assembly as claimed in claim 1, wherein said housing includes adjustable holding fixtures for supporting said stator member in said housing.

19. An assembly as claimed in claim 18, wherein said fixtures comprise a plate mounted to confront a smaller diameter end of said rotor member and plates mounted at lateral sides and at the bottom of said stator member.

20. An assembly as claimed in claim 19, further comprising heat insulating inserts positioned between said stator member and respective said plates.

21. An assembly as claimed in claim 1, wherein at least one of said conical bearing surface of said stator member and said outer surface of said rotor member is formed by a conical shaped sleeve secured against rotation relative to the respective said member.

* * * * *